(12) United States Patent
Kuo

(10) Patent No.: US 10,380,073 B2
(45) Date of Patent: Aug. 13, 2019

(54) USE OF SOLID STATE STORAGE DEVICES AND THE LIKE IN DATA DEDUPLICATION

(71) Applicant: FALCONSTOR, INC., Melville, NY (US)

(72) Inventor: Chin L. Kuo, Douglaston, NY (US)

(73) Assignee: FALCONSTOR, INC., Melville, NY (US)

( * ) Notice: Subject to any disclaimer, the term of this patent is extended or adjusted under 35 U.S.C. 154(b) by 206 days.

(21) Appl. No.: 14/532,952

(22) Filed: Nov. 4, 2014

(65) Prior Publication Data

US 2015/0127621 A1 May 7, 2015

Related U.S. Application Data

(60) Provisional application No. 61/899,669, filed on Nov. 4, 2013.

(51) Int. Cl.
*G06F 17/30* (2006.01)
*G06F 16/174* (2019.01)
*G06F 16/28* (2019.01)
*G06F 16/22* (2019.01)
*G06F 3/06* (2006.01)

(52) U.S. Cl.
CPC .......... *G06F 16/1748* (2019.01); *G06F 3/061* (2013.01); *G06F 3/067* (2013.01); *G06F 3/0641* (2013.01); *G06F 16/2255* (2019.01); *G06F 16/285* (2019.01)

(58) Field of Classification Search
CPC .............................................. G06F 17/30156
See application file for complete search history.

(56) References Cited

U.S. PATENT DOCUMENTS

| 7,165,145 | B2 | 1/2007 | Lam |
| 7,814,056 | B2 | 10/2010 | McGrattan et al. |
| 7,822,939 | B1 * | 10/2010 | Veprinsky ............. G06F 3/0608 711/161 |
| 8,321,648 | B2 | 11/2012 | Condict |
| 8,370,315 | B1 | 2/2013 | Efstathopoulos et al. |
| 8,370,593 | B2 | 2/2013 | Arakawa et al. |

(Continued)

OTHER PUBLICATIONS

International Search Report issued in the corresponding International PCT application No. PCT/US2014/063946, dated Jan. 15, 2015.

(Continued)

*Primary Examiner* — Khanh B Pham
(74) *Attorney, Agent, or Firm* — Brandon N. Sklar; Cozen O'Connor

(57) ABSTRACT

Systems and methods of data deduplication are disclosed comprising generating a hash value of a data block and comparing the hash value to a table in a first memory that correlates ranges of hash values with buckets of hash values in a second memory different from the first memory. A bucket is identified based on the comparison and the bucket is searched to locate the hash value. If the hash value is not found in the bucket, the hash value is stored in the bucket and the data block is stored in a third memory. The first memory may be volatile memory and the second memory may be non-volatile random access memory, such as an SSD. Rebalancing of buckets and the table, and use of additional metadata to determine where data blocks should be stored, are also disclosed.

13 Claims, 5 Drawing Sheets

(56) References Cited

U.S. PATENT DOCUMENTS

| | | |
|---|---|---|
| 8,370,594 B2 | 2/2013 | Niles et al. |
| 2011/0219106 A1* | 9/2011 | Wright .................. G06F 15/173 709/223 |
| 2011/0320865 A1 | 12/2011 | Jain et al. |
| 2012/0089578 A1 | 4/2012 | Lam |
| 2013/0046767 A1* | 2/2013 | Lee ..................... G06F 17/3033 707/747 |
| 2014/0115182 A1* | 4/2014 | Sabaa ................. H04L 67/1097 709/232 |
| 2014/0281123 A1 | 9/2014 | Weber |
| 2016/0253322 A1* | 9/2016 | Li ....................... G06F 12/0864 |

OTHER PUBLICATIONS

Written Opinion issued in the corresponding International PCT application No. PCT/US2014/063946, dated Jan. 15, 2015.
Wu, Chin-Hsien et al., "A Data De-duplication Access Framework for Solid State Drives", Journal of Information Science and Engineering 28, 941-954 (2012).
Kim, Jonghwa et al., "Deduplication in SSDs: Model and Quantitative Analysis", IEEE 978-1-4673-1747-4/12 (2013).
FalconStor Software, "How Data Deduplication Works", 4 pages (2010).
FalconStor Software, SAN Acceleration Using FalconStor® Network Storage Server (NSS) (2010).

\* cited by examiner

USE OF SOLID STATE STORAGE DEVICES AND THE LIKE IN DATA DEDUPLICATION

RELATED APPLICATION

The present application claims the benefit of U.S. Provisional Patent Application No. 61/899,669, which was filed on Nov. 4, 2013, is assigned to the assignee of the present application and is incorporated by reference herein.

FIELD OF THE INVENTION

Data deduplication and, more particularly, data deduplication using non-volatile random access memory, such as solid state storage devices.

BACKGROUND OF THE INVENTION

Data deduplication reduces storage requirements of a system by removing redundant data, while preserving the appearance and the presentation of the original data. For example, two or more identical copies of the same document may appear in storage in a computer and may be identified by unrelated names. Normally, storage is required for each document. Through data deduplication, the redundant data in storage is identified and removed, freeing storage space for other data. Where multiple copies of the same data are stored, the reduction of used storage may become significant. Portions of documents or files that are identical to portions of other documents or files may also be deduplicated, resulting in additional storage reduction.

A remote deduplication appliance may be provided to perform deduplication of other machines, such as client machines, storing data to be deduplicated. The deduplication appliance may provide a standard network file interface, such as Network File System ("NSF") or Common Internet File System ("CIFS"), to the other machines. Data input to the appliance by the machines is analyzed for data block redundancy. Storage space on or associated with the deduplication appliance is then allocated by the deduplication appliance to only the unique data blocks that are not already stored on or by the appliance. Redundant data blocks (those having a hash value, for example, that is the same as a data block that is already stored) are discarded. A pointer may be provided in a stub file to associate the stored data block with the location or locations of the discarded data block or blocks. No deduplication takes place until a client sends data to be deduplicated.

This process can be dynamic, where the process is conducted while the data is arriving at the deduplication appliance, or delayed, where the arriving data is temporarily stored and then analyzed by the deduplication appliance. In either case, the data set must be transmitted by the client machine storing the data to be deduplicated to the deduplication appliance before the redundancy can be removed. The deduplication process is transparent to the client machines that are putting the data into the storage system. The users of the client machines do not, therefore, require special or specific knowledge of the working of the deduplication appliance.

To implement data deduplication, in one example, data blocks are hashed, resulting in hash values that are smaller than the original blocks of data and that uniquely represent the respective data blocks. A 20 byte SHA-1 hash or MD5 hash may be used, for example. Blocks with the same hash value are identified and only one copy of that data block is stored. Pointers to all the locations of the blocks with the same data are stored in a table, in association with the hash value of the blocks.

The client machine may mount network shared storage ("network share") of the deduplication appliance to transmit the data. Data is transmitted to the deduplication appliance via the NFS, CIFS, or other protocol providing the transport and interface.

When a user on a client machine accesses a document or other data from the client machine the data will be looked up in the deduplication appliance according to index information, and returned to the user transparently, via NSF or CIFS, or other network protocols.

In another example, a deduplication appliance may mount a network share of a client to access and deduplicate data, as described in U.S. Patent Publication No. 2012/0089578 A1, which is assigned to the assignee of the present invention and is incorporated by reference herein.

SUMMARY OF THE INVENTION

In a typical hash table, a plurality of hash values or keys are stored in "buckets" that are typically 4 kilobytes ("KB"). In a 1 terabyte ("TB") hash table in an SSD, there are 250,000,000 buckets, each holding 143 hash values or keys. While a SHA1 hash tag algorithm produces a near perfect, uniform, discrete distribution without additional hashing, the buckets do not fill evenly. Based on Poisson Analysis, at least one of the 250,000,000 buckets is expected to be filled when an SSD is only 58% filled.

Extra, overthrow, buckets are therefore typically provided in the hash table. Alternatively or in addition, rehash algorithms are provided that select another bucket for placement of the hash value when the bucket that should receive the hash value is already full. However, these approaches require multiple writes in order to determine whether a hash value is present in a hash table, which slows processing.

In accordance with embodiments of the invention, systems and methods of data deduplication are disclosed comprising generating a hash value of a data block and comparing the hash value to a table in a first memory, such as a volatile, random access memory. The table correlates ranges of hash values with buckets containing those ranges of hash values in a second memory, such as a non-volatile random access memory, such as a solid state device. A bucket is identified based on the comparison and the bucket is searched to locate the hash value. If the hash value is not found in the bucket, the hash value is stored in the bucket and the data block is stored in a third memory. Embodiments of the invention further include rebalancing of the buckets and the table, and use of additional metadata to determine where data blocks should be stored, are also disclosed.

DETAILED DESCRIPTION

Figure 1:
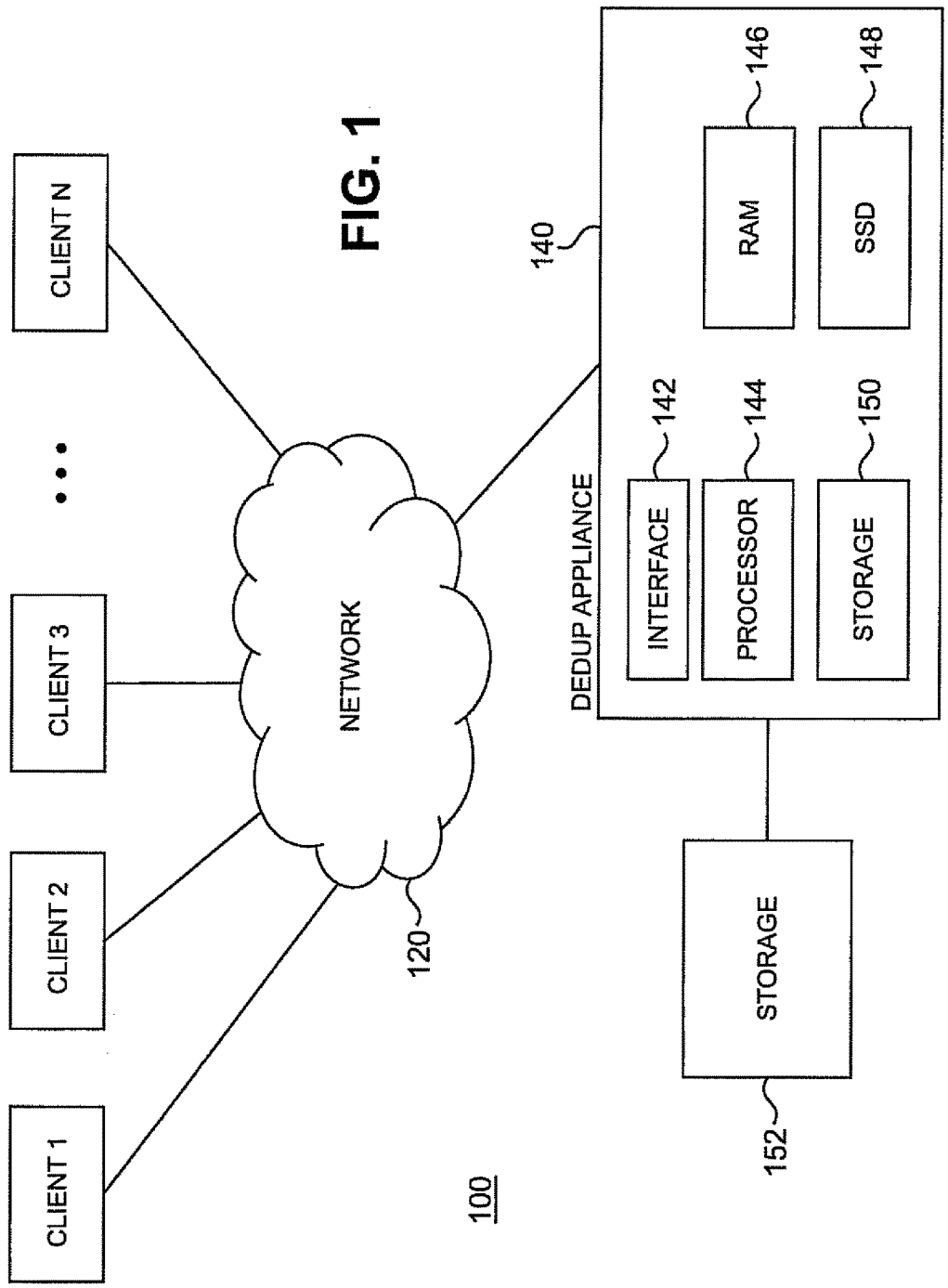
FIG. 1 is a block diagram of an example of a system for conducting deduplication by a deduplication appliance, in accordance with an embodiment of the invention.

FIG. 1 is a block diagram of an example of a system 100 in which deduplication may be conducted by a deduplication appliance 140, in accordance with an embodiment of the invention. The system 100 comprises one or more clients 1, 2, 3 . . . N, a network 120, and a deduplication appliance 140.

In FIG. 1, the deduplication appliance 140 may comprise a server or computer, for example. The deduplication appliance 140 comprises an interface 142, a processor 144, RAM 146, and a non-volatile random access memory, such as a solid state device ("SSD") 148. Additional storage 150 may also be provided in the deduplication appliance 150. Further storage 152 may be provided outside of the deduplicaiton appliance 140, as well.

The interface 142 may comprise any one or more of a number of different mechanisms, such as one or more SCSI cards, enterprise systems connection cards, fiber channel interfaces, modems, or network interfaces. In this example, the deduplication appliance 140 comprises a computer, such as an Intel processor-based personal computer.

The processor 144 may comprise one or more central processing units ("CPU(s)"), for example. Operation of the processor may be controlled by software, hardware, such as an application specific integrated circuit, or a combination of hardware and software, for example.

Each of the clients 1, 2, 3 . . . N may comprise hardware, software, or a combination of hardware and software. In one example, each of the clients 1, 2, 3 . . . N comprises one or more computers or other devices, such as one or more personal computers (PCs) servers, or workstations. Alternatively, one or more of the clients 1, 2, 3 . . . N may comprise a software application residing on a computer or other device.

The network 120 may comprise any one or more of a number of different types of networks. In one example, communications are conducted over the network 120 by means of IP protocols. In another example, communications may be conducted over the network 120 by means of Fiber Channel protocols. Thus, the network 120 may be, for example, an intranet, a local area network (LAN), a wide area network (WAN), Fiber Channel storage area network (SAN), Ethernet, or the Internet, for example. The network 120 may also use an Infini band network communications link, for example.

Deduplication functionality may be performed by any technique known in the art. In one example, the data received from client devices 1, 2, 3 . . . N is deduplicated by dividing the data into data blocks, or segments of data, and processing the data blocks by the processor 144. The deduplication appliance 140 reads each data block and computes a message digest or digital fingerprint, such as a hash value, of each data block. As used herein, the term "hash value" refers to any type of message digest which is smaller than the original respective data blocks and uniquely represents each data block. Hash values may be generated by substantially collision free algorithms that generate a probabilistically unique hash value based on inputted data. Examples of substantially collision free algorithms are the SHA-1 algorithm and the MD5 (message digest 5) algorithm. Either may for used, for example, as described in U.S. Pat. Nos. 7,962,499, 7,055,008, U.S. Patent Publication No. 2007/0198659, U.S. Patent Publication No. 2006/0218638, and U.S. Patent Publication No. 2012/0089578 A1 which are assigned to the assignee of the present invention and are incorporated by reference herein.

Data blocks that have already been hashed are stored in or by the deduplication appliance 140. A hash table may include a pointer or other such indicator of a location of the data block corresponding to a respective hash value.

Hash values for newly received data blocks are compared to hash values in the hash table. Alternatively, the deduplication appliance 140 may mount a network share of a client to access and deduplicate data, as described in U.S. Patent Publication No. 2012/0089578 A1, which is assigned to the assignee of the present invention and is incorporated by reference herein.

If a hash value for a newly received data block is in the hash table, then an identical data block has already been hashed and stored. It is not, therefore, necessary to store the newly received data block or the hash value. A pointer to the original location of the data block on the respective client machine may be stored in the hash table. A pointer to the location of the respective data block on the deduplication appliance may be provided to and stored by the respective client machine 1, 2, 3 . . . N.

If a hash value for a newly received data block is not stored in the hash table, the hash value is stored and the data block is also stored. A pointer to the data block may be provided in the hash table in association with the corresponding hash value.

In accordance with an embodiment of the invention, hash values stored are stored in the SSD 148 and in index to the hash values stored on the SSD is stored in the RAM 146. In addition, data blocks themselves may be stored in the SSD 148, the additional storage 150, and/or the further storage 152.

Figure 2:
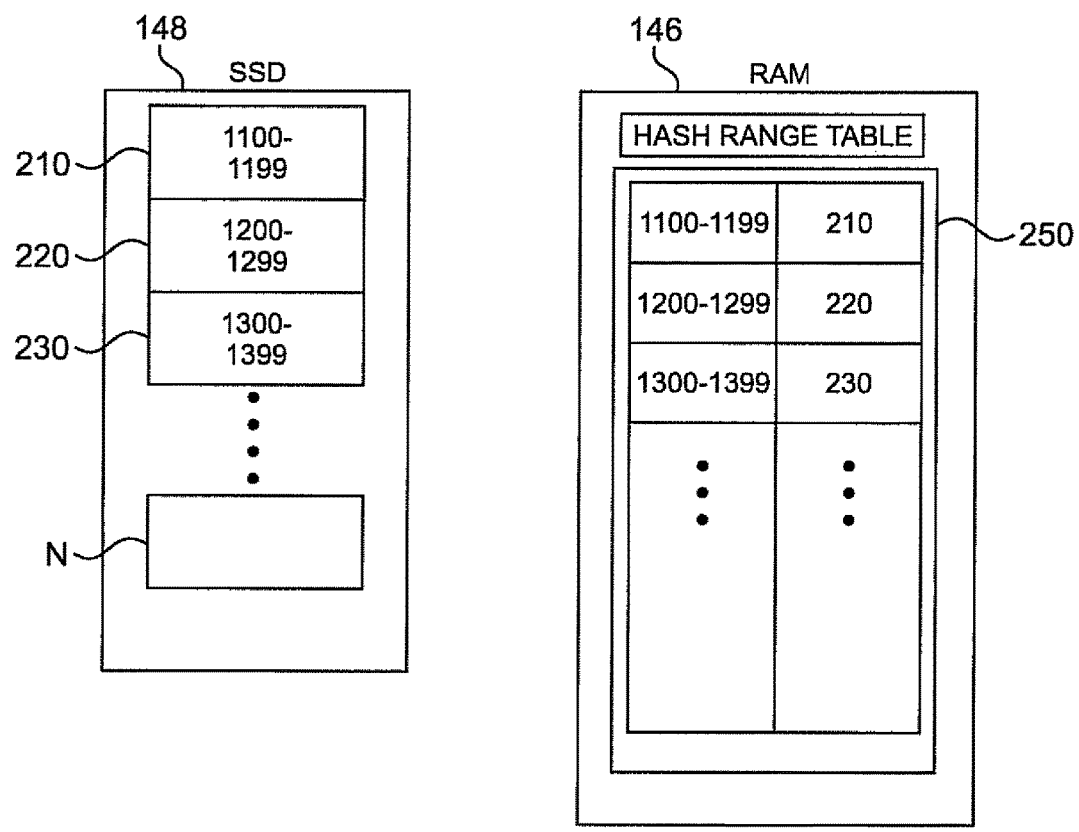
FIG. 2 is a schematic representation of a hash values stored in buckets in an SSD and a hash table correlating buckets with hash value ranges, in accordance with an embodiment of the invention.

In an illustrative example shown in FIG. 2, the hash values are stored in buckets 210, 220, 230 . . . N in the SSD 148. Each bucket includes a range of hash values. In this example, bucket 210 includes hash values 1100-1199, bucket 220 includes has values 1200-1299, bucket 230 includes has values 1300-1399, etc.

Also shown in FIG. 2 is the RAM 146, which includes a Hash Range Table 250. The Hash Range Table 250 correlates ranges of hash values with the buckets 210, 220, 230 . . . N in the SSD 148 containing those ranges. When a hash value of a data block from a client device 1, 2, 3 . . . N is calculated by the processing device 144 of the deduplication appliance 140, the hash value is compared to the ranges in the Hash Range Table 250 to identify where a hash having such a value would be stored in the SSD 148. For example, if the hash has a value of 1210, then it can be determined by searching the Hash Range Table 250 that such a hash, if present, would be stored in bucket 220 in the SSD 148. Use of such a Table 250 facilitates the determination that a hash value is present or not in the SSD 148. The determination may be made much faster than if the entire SSD 148 had to be searched for the hash value.

For most current SSD devices 148, 4K read and write size of the SSD may be used. Smaller sizes may not improve performance (and in some cases worsens it) and larger than 4K may be slower. However, for some SSD, other sizes may be optimal.

The value in FIG. 2 are for illustrative purposes. One example, in a 1 Terabyte SSD 148, 250 million buckets are present, each of which may have a size of 4K and can hold 143 hash values. The total number of SSD 4K block is uniformly divided in hash ranges in the Hash Range Table 250. The range of hash values in each SSD block is determined by: (8 bytes)/(total number of 4K SSD buckets). In one example, only a single SSD read for lookup and on average just over one SSD write for insertion are needed.

Figure 3:
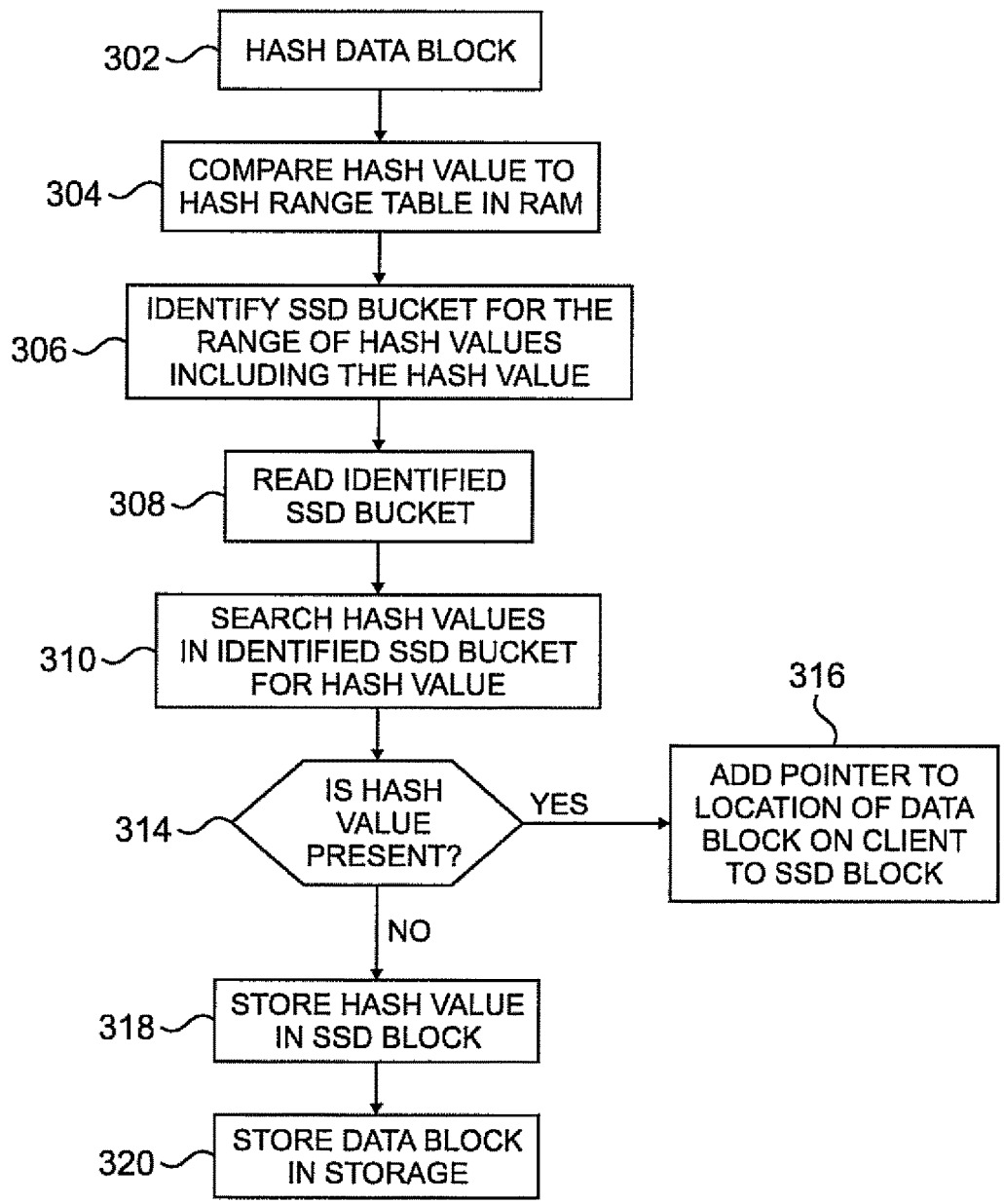
FIG. 3 is a flow chart of an example of data deduplication in accordance with the embodiment of FIGS. 1 and 2.

FIG. 3 is an example of a method 300 of deduplicating data, in accordance with an embodiment of the invention. A data block from a client device 1, 2, 3 . . . N is received by the deduplication appliance 140 and hashed by processor 144, in Step 302.

The hash value is compared to the ranges in the Hash Range Table 250 in RAM 146, by the processor 144, in Step 304.

The block in the SSD 148 identified by the Hash Range Table 250 is then searched for the hash value, by the processor 144, in Step 310.

It is determined whether the hash value is present, by the processor 144, in Step 314. If Yes, then it is not necessary to store the hash value again. A pointer to the location of the data block in the respective client machine 1, 2, 3 . . . N may be stored in the SSD 148, as well as a pointer to the source of the data block on a respective client device, in association with the hash value, for example.

If it is determined that the hash value is not present in the identified SSD block, then the hash value is stored in the SSD block, the data block is stored in the SSD, the storage 150, or the further storage 152, and pointers to the storage location and the source of the data block are associated with the hash value in the SSD block. The respective client machine providing the data block may be provided with a pointer to the location of the stored data block, as well.

Figure 4:
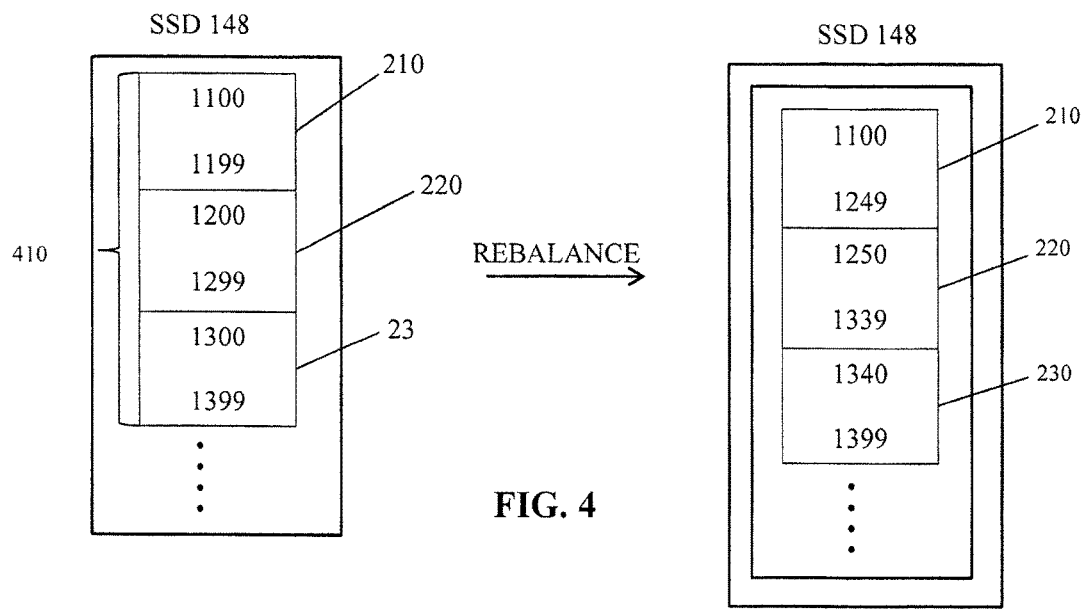
FIG. 4 is a schematic representation of rebalancing of buckets in the SSD, in accordance with another embodiment of the invention.

As discussed above, some buckets will typically fill before others. To account for unbalanced insertion of hash values in the SSD buckets over time, SSD buckets are grouped into rebalance groups of buckets having adjacent hash value ranges, for rebalancing. FIG. 4 is an example of a rebalance group 410, which contains buckets 210-230. Other buckets are grouped into rebalance groups (not shown), as well.

The hashes within a rebalance group 410 are moved within the rebalance group when any SSD buckets 210, 220, 230 . . . N within the balance group becomes full. The hash value range for each rebalance group does not change. Limiting the rebalancing to a balance group enables the operation to be performed in an acceptable amount of time and ensures that the hash values are fairly evenly distributed without rebalancing all the SSD buckets.

The degree of respective bucket 201, 220, 230 within the balance group 410 is full, or the amount of available space in the block, may be monitored by the processor 144 in the manner known in the art. When a block is full, or within a predetermined amount or percentage of being full (or the available amount or percentage space is below a threshold, for example), the processor 144 may cause a rebalancing of the blocks by changing the boundaries of some or all of the blocks in the group 410.

In this example, the buckets 220 is full or nearly full, while buckets 230 and 240 have available space. During rebalancing, the processor 144 widens the boundary of block 210 to include hash values 1100-1249, which, in this example, includes hash values that were in the bucket 220 before rebalancing. Bucket 220 now includes hash values 1250-1339, taking available space from the bucket 230. Bucket 230 now includes hash values 1340-1399.

Figure 5:
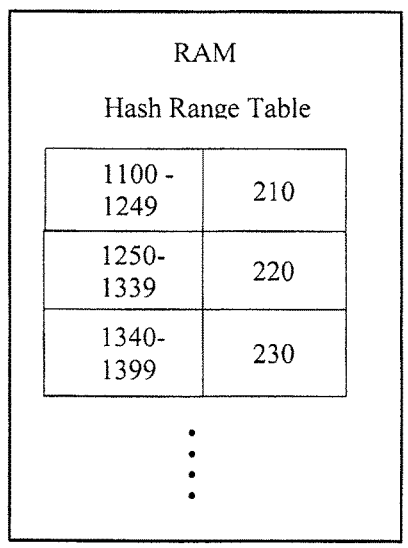
FIG. 5 is a schematic representation of the hash range table, updated to reflect the rebalancing in FIG. 4.

After rebalancing, the processor 144 updates the Hash Range Table 250 in RAM to reflect the new boundaries, so that the blocks 210, 220, 230 within the balance group 410 may be readily searchable, as shown in FIG. 5.

Figure 6:
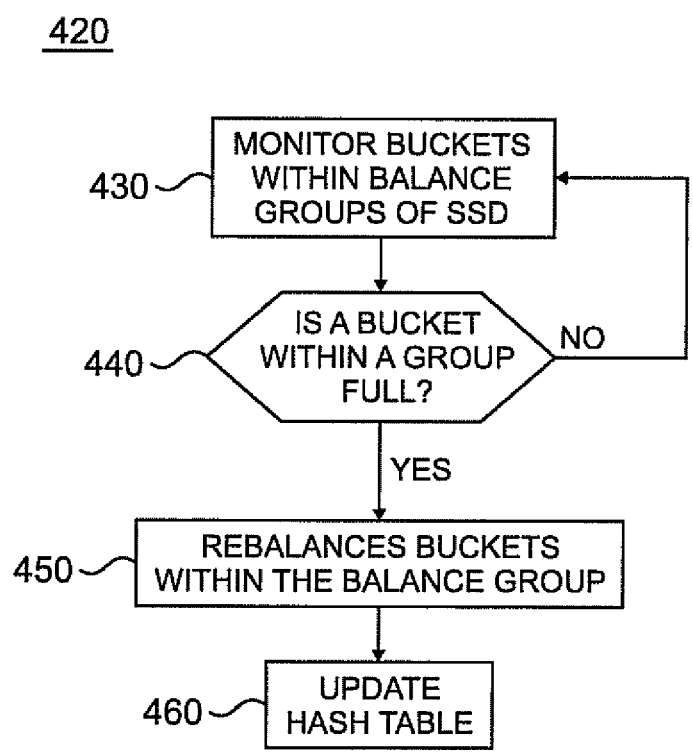
FIG. 6 is a flowchart 420 an example of a method for rebalancing buckets in balance groups, in accordance with an embodiment of the invention.

FIG. 6 is a flowchart 420 an example of a method for rebalancing buckets in balance groups, in accordance with an embodiment of the invention. The buckets of respective balance groups are monitored by the processor 144, in Step 430. It is determined by the processor 144 whether a respective bucket is full or nearly full, in Step 440. If No, monitoring continues in Step 430. If Yes, the processor 144 rebalances the boundaries of the bucket and other buckets in the respective balance group, in Step 450. Then the Hash Range Table 250 is updated by the processor 144 to reflect the new ranges, in Step 460.

To limit the need for rebalancing because it is a performance penalty, buckets may be over allocated to reduce the need for rebalancing.

The time for performing this rebalance operation is quite small. In one example, about 500 rebalances may be performed per second. This continues until a rebalance group is full. A Poisson based analysis of this approach shows that the first rebalance group to fill will occur when 99.7% of the capacity of the SSD 148 is used.

SSD 148 may be used to store metadata beyond that needed for deduplication. Basic deduplication requires the data hash and pointer to data block location, as discussed above. In accordance with another embodiment of the invention, references and time to hash may be tracked for deciding where the hash data block should reside and the number of copies to keep. Typically the more references there are to the hash value, the greater the importance of the corresponding data block is to the client. Multiple copies of the data block corresponding to the hash value may be kept. Having more references to a block of data may also mean that the block is more likely to be needed for a restore than other.

In one example, the storage 150 comprises a fast access storage, such as serial attached SCSI ("SAS") storage. The storage 152 comprises tape. Data blocks that are or may be needed more often may be stored in the SSD 148 or the storage 150, while data blocks having fewer and older references may be stored in slower storage, such as the tape 152.

In one example, the processor 144 adds to the hash value additional fields to identify and accumulate additional information, such as a date of original creation, a number of times, and dates a respective hash is searched for, for example. The fields may be before and/or after the hash value. Alternatively, some or all the additional information may be associated with the hash value in a table, for example, by the processor 144.

The software allows the client to set a policy to control the exact behavior on copies and exact storage location. The processing device 144 may monitor the metadata in or associated with the hash values to determine which data blocks should be stored in which storage. The number of times a particular hash value has been searched, the last time a hash value has been searched, etc., may be compared to thresholds that determine where data blocks corresponding to the respective values are to be stored, for example.

It will be appreciated by those skilled in the art that changes may be made to the embodiments described herein, without departing from the spirit and scope of the invention, which is defined by the following claims.

I claim:

1. A method of deduplicating data, comprising:
providing a plurality of hash buckets in memory, each hash bucket storing a respective range of hash values corresponding to deduplicated data blocks;

grouping the plurality of hash buckets into respective groups of hash buckets having adjacent hash value ranges, wherein each group includes at least a first hash bucket and a second hash bucket having adjacent ranges of hash values, and each group has a respective range of hash values stored within the group;

monitoring the hash values stored in the hash buckets in the respective groups;

only changing the respective ranges of hash values in a first hash bucket and a second hash bucket within a respective group without changing the range of hash values stored within the group based, at least in part, on a degree the first hash bucket in the respective group is full; and moving hash values only from the first hash bucket to the second hash bucket within the respective group to match the changed ranges.

2. The method of claim 1, further comprising:

generating a hash value for a data block;

comparing the hash value to a table in a first memory, the table correlating ranges of hash values with ranges of respective hash buckets in a second memory different from the first memory;

identifying a hash bucket based on the comparison;

searching the identified hash bucket in the second memory; and if the hash value is not found in the hash bucket:
storing the hash value in the hash bucket; and
storing the data block in a third memory.

3. The method of claim 2, wherein:

the first memory comprises volatile memory; and the second memory comprises a non-volatile random access memory.

4. The method of claim 3, wherein the non-volatile random access memory comprises a solid state storage device.

5. The method of claim 4, wherein the volatile memory comprises random access memory.

6. The method of claim 1, further comprising:

receiving the data block for deduplication via a network.

7. The method of claim 1, comprising changing the respective ranges of the first hash bucket and the second hash bucket if:

the first hash bucket is full;

the first hash bucket is within a predetermined amount of being full;

the first hash bucket is within a predetermined percentage of being full;

the first hash bucket has an available amount of space below a threshold; or the first hash bucket has an available percentage of space below a threshold.

8. A deduplication system comprising:

memory; and at least one processing device configured to:

provide a plurality of hash buckets in the memory, each hash bucket to store a respective range of hash values corresponding to deduplicated data blocks;

group the plurality of hash buckets into respective groups of hash buckets, wherein each group includes at least a first hash bucket and a second hash bucket having adjacent ranges of hash values, and each group has a respective range of hash values stored within the group;

monitor the hash values stored in each hash bucket in the respective groups;

only change the respective ranges of hash values in a first hash bucket and a second hash bucket within a respective group without changing the range of hash values stored within the respective group based, at least in part, on a degree the first hash bucket is full; and only move hash values from the first hash bucket to the second hash bucket within the respective group to match the changed ranges.

9. The deduplication storage system of claim 8, wherein:

the memory comprises:

volatile memory; and non-volatile random access memory to store the plurality of hash buckets; and the at least one processing device is further configured to:

generate a hash value for a data block;

compare the hash value to a table in the volatile memory, the table correlating ranges of hash values with respective ranges of hash buckets in the non-volatile random access memory;

identify a hash bucket in the non-volatile random access memory based on the comparison;

search the identified hash bucket in the non-volatile random access memory; and if the hash value is not found in the hash bucket:

store the hash value in the hash bucket; and store the data block in a third memory.

10. The system of claim 9, wherein the non-volatile random access memory comprises a solid state storage device.

11. The system of claim 10, wherein the volatile memory comprises random access memory.

12. The system of claim 8, wherein the least one processing device is further configured to receive data blocks for deduplication, via a network.

13. The system of claim 8, wherein the at least one processing device is configured to change the respective range of hash values in the first hash bucket and the second hash bucket if:

the first hash bucket is full;

the first hash bucket is within a predetermined amount of being full;

the first hash bucket is within a predetermined percentage of being full;

the first hash bucket has an available amount of space below a threshold; or the first hash bucket has an available percentage of space below a threshold.

* * * * *